Sept. 26, 1950 K. W. PFLEGER 2,523,717

CORRECTION OF DISTORTION IN TELEGRAPH SIGNALS

Filed Aug. 20, 1946

INVENTOR
K. W. PFLEGER
BY John E. Cassidy
ATTORNEY

Patented Sept. 26, 1950 2,523,717

UNITED STATES PATENT OFFICE 2,523,717

CORRECTION OF DISTORTION IN TELEGRAPH SIGNALS

Kenneth W. Pfleger, Arlington, N. J., assignor to Bell Telephone Laboratories, Incorporated, New York, N. Y., a corporation of New York Application August 20, 1946, Serial No. 691,851

4 Claims. (Cl. 178—69)

Figure 1:
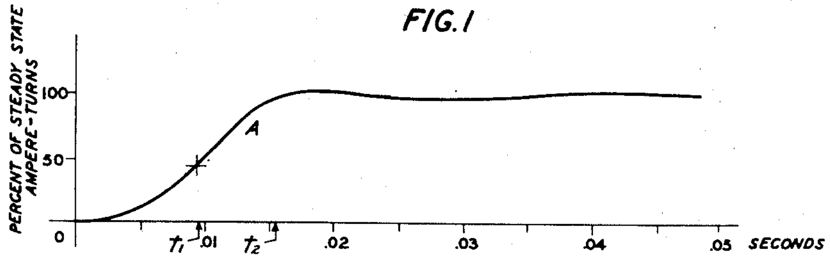

This invention relates to improvements in the correction of distortion in received telegraph signals and more particularly to improvements in that form of distortion corrector which effects the correction by generating a complementary signal at the receiving station.

More specifically this invention is both a more effective and more economical means of generating a signal locally at the receiving station which exactly complements the received telegraph signal to eliminate distortion.

An object of this invention is the correction of distortion in received telegraph signals.

A more particular object of the invention is the more effective correction of distortion and by more economical means.

There are presently known in the art a number of means for correcting distortion in received telegraph signals. Among these are arrangements for generating a complementary signal at the receiving station in response to the reception of the distorted signal. The complementary signal generated at the receiving station is formed in a particular pattern by the cooperation of the elements in the complementary signal generating circuit. The pattern of the complementary signal is such that when it is in effect added to the received signal, or impressed on the receiving device, such as a relay, on which the received distorted signal is impressed, the combination of the distorted signal and the complementary signal approximate an undistorted signal. By means of the present invention it is possible to improve the combined signal and this is achieved with a minimum of apparatus elements so that the complementary signal generating circuit is made so inexpensive that it can be much more widely applied economically. The application of the presently known distortion correction circuits because of their higher cost was limited to more expensive long toll circuits where distortion correction was necessary. The present arrangement, because of the few inexpensive elements required, may be economically applied wherever distortion correction may be desirable.

The improved distortion corrector is due to the discovery that by starting the corrective transient at a certain instant, only a simple two or three element circuit is required whose response, when properly combined with that of the incoming distorted signal from the line, produces an overall indicial admittance which is substantially flat from the time that the combining of the distorted signal and the local transient starts, to the times of transitions for the succeeding signals.

By flattening the indicial admittance the transient tail due to one transition is prevented from distorting the following transitions since the received wave shape due to miscellaneous signals is made up by superposition of curves each proportional to the indicial admittance and suitably displaced in time.

The criterion of distortionless transmission in the present invention is that the width or duration of each signal element at the mean value point shall be undistorted. By the use of the arrangement of the present invention a signal of any duration longer than the time required for the indicial admittance to attain half value may be correctly reproduced and it is not necessary to make the signal elements of uniform duration.

Figure 2:
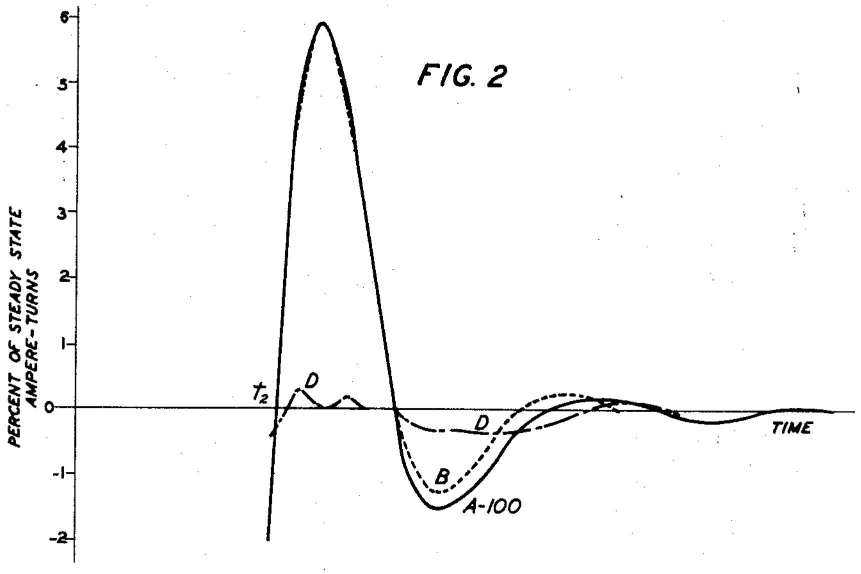
Figure 3:
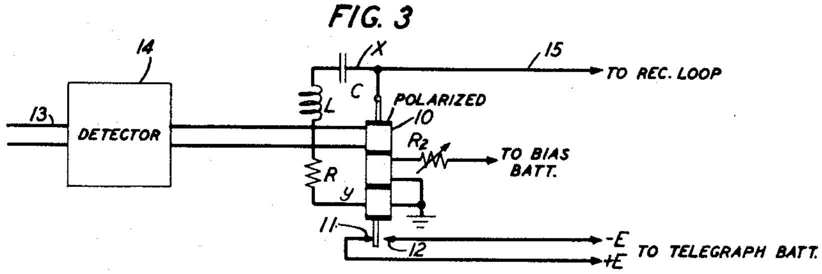
Figure 4:
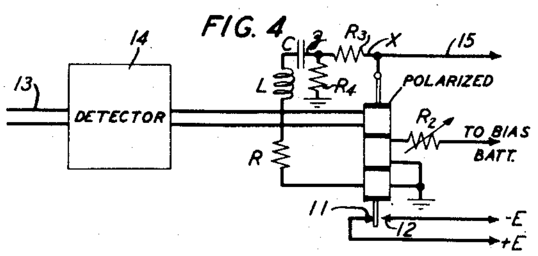

The invention may be understood from reference to the associated drawings in which:

Fig. 1 shows the indicial admittance of a typical voice frequency telegraph carrier channel; it is proportional to the envelope of the received wave due to suddenly turning on the sent carrier current, and is expressed as magnetomotive force in the receiving relay;

Fig. 2 is a plot to an enlarged scale, of the variations from steady-state condition in the indicial admittance represented in Fig. 1, as shown on curve A—100, together with a plot of the correcting damped oscillatory transient, shown on curve B, also on an enlarged scale and a plot of the deviation between the two, shown on curve D which represents the departure from the ideal on a corresponding scale;

Fig. 3 shows a typical telegraph receiving circuit in which the distortion correction arrangement of the present invention is incorporated; and Fig. 4 shows a typical telegraph receiving circuit in which the distortion correction circuit arrangement of the present invention is incorporated which differs from the arrangement in Fig. 3 in that the transient generating circuit is equipped with a potentiometer to control the voltage applied to the transient generating circuit.

Refer now to Fig. 3 which shows a portion of a typical voice frequency telegraph receiving circuit. The circuit is shown in the marking condition with the armature of relay 10 actuated to engage with its marking contact 11. Current normally flows from biasing battery through resistance R2 and the middle winding of relay 10 to ground. The effect of this current tends to actuate the armature of relay 10 to engage with its spacing contact 12. However, during the marking condition alternating current signals are impressed through the connecting circuit 13 on rectifier 14 wherein they are rectified and direct current signals are impressed on the top winding of relay 10. The effect of the marking signals in the top winding tends to pull the armature 10 to marking contact 11, and preponderates over the effect of the current in the biasing winding, and the armature of relay 10 is thus maintained in engagement with contact 11. For the spacing condition no signals are received through the top winding of relay 10 and the effect of the current in the biasing winding actuates the armature of relay 10 to engage with its spacing contact 12. Positive and negative battery are thus impressed through contacts 11 and 12 for the marking and spacing condition on conductor 15 which extends to the receiving loop.

The received signals are subject to considerable distortion which affects the operation of the relay. In accordance with the present invention it has been found possible to correct this distortion by the interconnection of the three-element transient generating circuit consisting of the condenser C, the inductance L and the resistance R between the top terminal of the armature of relay 10 and a third winding which is the bottom winding shown on the relay. The considerations governing the design of the transient generating circuit will be discussed hereinafter. The condenser inductance, resistance circuit is arranged so as to develop a timed oscillatory transient approximating the wave of curve A—100 in Fig. 2, which is the curve of the tail of Fig. 1 to an enlarged scale. The approximation achieved by following the method herein, as will be explained hereinafter, is as shown on curve B in Fig. 2. The transient B is generated in response to the application of voltage +E, as the armature of relay 10 is actuated to engage its marking contact 11 which applies the voltage +E to the local transient generating circuit comprising the capacitance C, the inductance L and the resistance R. This, as is well known, produces a damped oscillatory transient voltage wave which flows directly through the bottom winding of relay 10. On the opposite transition of the armature an inverted wave B, not shown, will be produced to correct the distorted tail of the spacing signal, not shown. The connections to the bottom winding are so poled and the application of the transient is so timed, as explained hereinafter, that the oscillations produced by the local transient generating circuit in the bottom winding annul the oscillations in the received wave on each transition so as to provide in effect combined waves which become and remain substantially flat at their full value and zero value levels. The flattening is achieved, in a manner to be explained, before the start of the reverse slope of the signal of the shortest duration, namely, a signal having a duration equal to that of a single element. The wave remains substantially flat thereafter. The variations from flatness being as shown in curve D, also to the same enlarged scale.

The indicial admittance of a typical voice frequency carrier channel is shown in Fig. 1 in terms of per cent of steady-state ampere-turns in the line winding of relay 10, which is assumed to be a symmetrical polar receiving relay, versus a chosen time scale, assuming a linear detector and neglecting steady rectified current during spacing in the receiving circuit of Fig. 3. A curve similar to Fig. 1 would appear in an oscillogram of the current in the relay's top or line winding due to a single space-to-mark transition. When the curve reaches half value at time $t_1$ the magnetomotive force in the relay due to the direct current in the biasing winding is annulled. Further increase in the line winding current causes the relay contact to change from spacing to marking. It is intended that at this instant of closing the marking contacts the effect of the transient generating circuit shall be started to bring any arrival curve such as that shown in Fig. 1 to a final steady-state value very soon after time $t_1$.

The shortest signal that can be transmitted without telegraph distortion in the ordinary sense, must not be shorter than the time it takes the indicial admittance to build up from zero value to half value in order that the first transition of a single mark shall not be displaced by the building down transient of the second transition. In order to clearly understand what this means, let the curve of Fig. 1 be expressed as a function of time, thus: $A(t)$. Now the arrival curve due to sending a single mark of duration T is obtained by superposition of indicial admittances suitably displaced in time; thus it is:

$$[A(t)-A(t-T)]$$

Now if T is less than the time it takes $A(t)$ to build up from zero to half value, it is obvious that $A(t-T)$ will have finite value before $A(t)$ has built up to half value. Therefore the term $A(t-T)$ will affect the location of the half value point of the first (space to mark) transition of the received signal. On the other hand, if T is equal to or greater than the time it takes $A(t)$ to build up from zero to half value, the term $A(t-T)$ will have zero value at the first transition in the received signal and therefore will not cause distortion in that transition, assuming the receiving relay operates at the half value point.

Obviously, there is no advantage gained by flattening the indicial admittance immediately at time $t_1$ and one may start to flatten it any convenient time between $t_1$ and the value $t_1$ plus the duration of the shortest signal element. This is fortunate because a practical relay does not operate instantaneously and its action may be delayed until a most convenient time by suitable choice of relay operating ampere-turns and adjustment of mechanical and magnetic parts, or delay may be inserted in the feedback circuit either in the form of a delay network or one or more intermediate relays so that the local transient can be started at a time when the simplest network will suffice.

A plot of Fig. 1 on a very much enlarged scale shows a number of small wiggles in the indicial admittance before building up, that is, to the left of the position where the curve A rises from the zero line and between this point and the zero time ordinate. However, these small wiggles which are not indicated in the curve per Fig. 1, all have amplitudes much less than one per cent of final steady-state values and are therefore negligible for practical purposes. Building up may be considered to start at the final zero value shown in Fig. 1 and which is .0085 second before time $t_1$. A signal element .0085 second long corresponds to a speed of 58.8 dots per second and can be sent without distortion when the first instant of effective flattening of the indicial admittance does not lag $t_1$ by more than .0085 second.

As may be observed from the curve in Fig. 1 the indicial admittance is oscillatory and a plot of the wiggles referred to steady-state value as zero, shown to an enlarged scale as curve A—100 in Fig. 2 resembles the well-known damped oscillatory current of a condenser C in series with a coil L and a resistance R when a direct voltage is applied at about the instant $t_2$=.0156 seconds. Such a response is proportional to curve B in Fig. 2 and the method used for designing elements R, L and C in Fig. 3 is explained hereinafter. Now the start of this response is about .0001 second earlier than $t_2$, or .006 second later than $t_1$ and therefore lies within the .0085-second limit required for maximum speed.

As shown in Fig. 3, the current proportional to curve B is impressed on relay 10 through a special feedback winding which is the bottom winding in Fig. 10 and the indicial admittance is thereby flattened when the winding is properly connected except for the deviation indicated in the curve D in Fig. 2. The deviation D equals the difference between the curve A—100 and the curve B. This difference as indicated in the enlarged scale of Fig. 2 is tolerable as it remains less than a small fraction of one per cent ± at all times.

The distortion may be approximately estimated as follows: From Fig. 1 measurements indicate that the slope at time $t_1$ or .0095 second is $10^4$ per cent per second. The same slope reversed in sign applies at the half value point during the building down transient of a distortionless mark. The amplitude error at the half value point on the building down transient is shown by curve A—100 without feedback equalization and is 5.7 per cent when $t=t_1+.0085$ second=.018 second corresponding to the end of a short marking signal. The time displacement is then 5.7 divided by $10^4$ seconds and the mark has been lengthened 6.7 per cent of a .0085-second dot length. When feedback is used the amplitude error is given by curve D. At .018 second, or at the end of a single marking signal element, the variation between curves A—100 and B is practically negligible, so there will be practically no distortion. At the end of a double length mark at time $$t=t_1+.017 \text{ second}=.0265 \text{ second}$$

the ordinate of curve D is −.27 per cent which is worse than at the end of a mark lasting for any other multiple of .0085 second. Accordingly, the time displacement is −.27 divided by $10^4$ seconds corresponding to a shortening of the double length mark=to .32 per cent of a single dot length, thus giving a theoretical improvement of 21:1 in the worst distortion due to a single mark of any length. While this improvement is estimated only from the current, this is a reasonable criterion for the improvement in relay operation which will be the same except for minor relay imperfections. The computations for the constants of the elements required in the transient generating circuit follow.

Let the resistances of the feedback winding, that is, the bottom winding in Fig. 3 and of coil L and condenser C as well as the telegraph battery be included in the value R and likewise let the total series inductance of the oscillatory circuit be included in the value L. Other circuits, not shown, connected to the relay tongue are assumed to be negligible since they have impedance much greater than battery. Assume R and L constant in order to simplify computing. Suppose the tongue has been for a long time on one contact and then suddenly shifts to the other. Neglecting travel time and spark killers the voltage change on lead X amounts to 2E and produces a current in the feedback winding equal to:

$$I_F=\frac{4E}{q}e^{-R(t-t_0)/2L}\sin[q(t-t_0)/2L] \qquad (1)$$

when $$R^2<4L/C$$

$t$=time from arbitrary zero measured in seconds
$t_0$=time of contact closure measured in seconds
$q=\sqrt{(4L/C)-R^2}$
$e$=base of natural logarithms
R, L, and C are expressed in ohms, henrys, and farads, respectively Let $N_F$=number of turns in the feedback winding
$N_L$=number of turns in the line winding
$I_L$=current increment in line winding on changing from space to mark after transient dies down Then $I_FN_F$=instantaneous ampere-turns in feedback winding
$I_LN_L$=ampere-turns increment in line winding corresponding to space-to-mark transition after transient dies down
$100\ I_FN_F/I_LN_L$=per cent of $I_LN_L$ which are caused by current $I_F$ in feedback winding.

Now it is desired that $100\ I_FN_F/I_LN_L$ shall simulate as closely as possible curve A—100 in Fig. 2. Accordingly it is desired that $$A-100=\frac{400EN_F}{I_LN_Lq}e^{-R(t-t_0)/2L}\sin[q(t-t_0)/2L] \qquad (2)$$

The simulation is carried out by trial. One clue is that $q/2L$ in the argument of the sinusoidal factor is about equal to $2\pi$ times the the frequency of oscillation. Another clue is that the factor with base $e$ gives the ratio of amplitudes of successive half waves when $t-t_0$ is equal to the duration of a half wave. The coefficient $$400\ EN_F/I_LN_Lq$$

should be adjusted to give the damped oscillation the desired amplitude. $t_0$ should be somewhere near $t_2$, but not necessarily exactly equal to $t_2$ since curve A—100 may not be capable of exact simulation. After one or two trials the following appears to be satisfactory:

$$\frac{400EN_F}{I_LN_Lq}=.115 \qquad (3)$$

$$R/2L=170 \qquad (4)$$

$$q/2L=340 \qquad (5)$$

so that:

$$B=.115e^{-170(t-t_0)}\sin 340\ (t-t_0) \qquad (6)$$

with $t_0$=.0155 sec.=$t_2$—.0001 second.

According to the present result the relay should be set to make contact .0001 second sooner than $t_2$ if the B curve is used.

From (3) it follows that:

$$q=3{,}478\ EN_F/(N_LI_L) \qquad (7)$$

Substituting (7) into (5) and solving:

$$L=5.115\ EN_F/(N_LI_L) \qquad (8)$$

Substituting (8) in (4) and solving:

$$R=1739\ EN_F/(N_LI_L) \qquad (9)$$

Substituting (7), (8) and (9) in the formula for $q$ given prior to (2) and solving $$C=(1.353\ N_LI_L/EN_F)10^{-6} \qquad (10)$$

The following values may be assumed for a particular case:

$N_L=7600$
$N_F=400$
$I_L=.01$ ampere
$E=50$ volts.

Then $$EN_F/N_LI_L=263,$$

and $R=1739\times263=.456$ megohm
$L=5.115\times263=1345$ H
$C=(1.353/263)10^{-6}=.00515$ microfarad.

Now $$100\ I_FN_F/I_LN_L=B.$$

When B has the maximum value of 5.9 it follows that the maximum value of $I_F$ is $$I_F=5.9\ I_LN_L/100\ N_F=.01121 \text{ ampere}$$

It is particularly pointed out that if desired the damped oscillatory transient wave generated in the capacitance, inductance, resistance series circuit may be applied to the lower winding of the relay or to some part of the circuit which includes the upper winding, through a transformer or other means. It is also pointed out that the magnitude of the voltage applied to the generating circuit may be controlled by means of a potentiometer comprising resistances $R_3$ and $R_4$ as shown in Fig. 4 so that it need not be the same magnitude as applied to the receiving loop. The magnitude of the constants of the elements required in the generating circuit can be controlled by these various means.

The circuit and the mode of operation of Fig. 4 is the same as that of Fig. 3, except for the employment of a potentiometer comprising the resistance element $R_3$ and $R_4$ the values of which may be chosen to apply any part of the voltages of batteries E and $-E$ across the transient generating circuit. This permits a wider latitude in the choice of the values of the constants of the capacitance, inductance and resistance elements in the circuit.

In the arrangement per Fig. 4 the voltage of the battery could be $k$ times that used in the generating circuit where $k$ is a constant greater than unity, and the voltage used in the generating circuit computations is E which is the effective electromotive force as seen from condenser C looking to the right toward $z$. The value of E may be computed where $k$E is known.

It is clear that when the potentiometers arrangement per Fig. 4 is employed and $R_4$ is small compared to $R_3$, the oscillatory transient due to a space to mark transition may continue indefinitely until damped out. A particular transient once generated will not be terminated by the succeeding armature transition but will continue to correct the indicial admittance indefinitely.

In summation, therefore, as explained in the foregoing, the essential aspects of the present arrangement for correcting distortion in received signals is as follows:

The curve representing the individual admittance of a circuit is proportional to the oscillogram of the current in the line winding of the receiving relay due to the sudden application of unit voltage at the sending end.

The characteristic curve has a tail which resembles a damped oscillatory transient, oscillating about the full or zero amplitude line of the curve of the received signal impulse.

The wave form of the tail can be closely approximated by the generation of a damped oscillatory transient in a capacitance, inductance, resistance network.

The calculations on which the choice of the constants of the capacitance, inductance, resistance elements are based are presented in the foregoing.

The damped oscillatory transient is generated in a circuit, condenser C, inductance L, resistance R, Fig. 3, local to the receiving relay 10 and is applied to the bottom winding of the relay in such a manner as to annihilate the damped oscillatory vibrations of the tails of the received waves.

It is, of course, important that the locally generated damped oscillatory transient wave be applied to the bottom winding of relay 10 in a proper sense by connection to the proper terminal of the winding and at a proper time so as to flatten the received wave. The manner of determining the time of application of the locally generated transient so that it does in fact flatten the received wave is presented in the foregoing calculations. The transients are generated in response to the closure of the relay contacts and the correcting wave B, Fig. 2 may be displaced as necessary along the the time axis by adjusting the time of closure of the contacts. If the adjustment required is excessive, delay may be employed, as explained in the foregoing.

It is particularly pointed out that Fig. 1 and Fig. 2 apply on the space to mark transition. The operation of the circuit on a mark to space transition is the same but the curve of Fig. 1 drops to the zero level and the tail oscillates about the zero line. The curves of Fig. 2 would of course be inverted.

Attention is called to the fact that the horizontal distance from the mid or armature transition point on the rise of the curve in Fig. 1 to a corresponding point on the fall of the curve, on a mark to space transition, determines the length of a received signal. The curve may fall, for instance, or rise, at the end of a signal of one, two, three, four or five elements in duration. It is important only according to the invention that the fall or rise start from the one hundred per cent or zero per cent line. This is established by the flattening of the arrival curve at the full or zero level, at any time before the first possible transition, and maintaining it thereafter at that level for the duration of the longest group of signal elements which may be transmitted. Then since the slopes are unvarying, differing only in sign, the lengths of the intervals between transition points will be the same as the intervals between the signals as transmitted.

What is claimed is:

1. In a telegraph system, a telegraph receiver, means for impressing direct-current telegraph signal waves of current, no-current conditions on said receiver, said signal wave subject to distortion, said distortion consisting in a damped oscillation of the tail of said signal wave about the steady state amplitude of said wave, said distortion occurring at full and zero amplitude of said signal wave, on each transition of said signal wave between each of said current conditions, means connected to said receiver for generating a timed damped oscillatory transient on each transition of said signal wave between said conditions, said transient corresponding to the distorted pattern of said tail, means for controlling the instant at which said transient is applied to said receiver and means for impressing said transient on said receiver in a manner to correct said distortion.

2. In a telegraph system, a telegraph receiving relay, a line winding on said relay, an incoming circuit connected to said winding, means for impressing, through said circuit, on said winding, a direct-current telegraph signal wave, said wave having a distorted tail resembling the form of a damped oscillatory transient, a timed damped oscillatory transient generating circuit consisting of a source of potential connected in series through a contact and an armature, both on said relay, and a lumped capacitance and a lumped inductance and a lumped resistance to a second winding on said relay, the magnitude of the constants of said potential, capacitance, inductance and resistance in said generating circuit and the instant of the application of the transient generated therein being established to correct said distortion.

3. In a telegraph receiver for receiving direct-current signal waves of current, no-current signal conditions, said waves subject to distortion, said distortion including a variation in the tail of each of said waves resembling a damped oscillatory transient oscillating about the final steady state full-current and no-current amplitudes of said waves for said conditions, a magnetic polar relay, an armature and two opposed contacts thereon, a line winding and a biasing winding on said relay, means connected to said biasing winding for generating therein a magnetizing force equal and opposite to one-half of that generated in said line winding when said line winding has full steady state current therein, a timed damped oscillatory transient generating circuit, connected to said relay, said generating circuit comprising a source of direct-current potential, a lumped capacitance, a lumped inductance, and a lumped resistance, the constants of said generating circuit chosen so as to generate a transient corresponding to said distortion, said generating circuit responsive to transitions of said armature between said contacts to generate said transient on each transition, means connected to said generating circuit for producing a magnetic effect in said relay on each said transition corresponding to and opposed to the magnetic effect produced simultaneously by the distortion of said tail in said line winding, so as, in effect, to flatten said current and no-current signals at their normal full steady state and zero current values, before the first possible transition of said armature between said contacts after the reception of a signal element and thereafter, so that the time intervals between times of transition of said armature between said contacts corresponds to the duration of signals as transmitted from the transmitter to said relay.

4. In a telegraph system, a direct-current polar telegraph receiving relay, said relay having an armature, a marking contact, a spacing contact, a line winding and biasing means, a transient voltage generating circuit comprising sources of direct-current potential of opposed polarities and a lumped capacitance, a lumped inductance, and a lumped resistance all connected to said relay, an incoming telegraph line and an outgoing telegraph line connected to said relay, means for impressing incoming direct-current signals of current and no-current conditions through said incoming line on said line winding, said armature actuable under the influence of current signaling conditions to engage its marking contact and actuable, under the influence of said biasing means, to engage its spacing contact while no-current conditions prevail, the effect of said biasing means equal to one-half the effect of said current condition at full-current value and opposed thereto, said signals subject to distortion as contrasted with idealized direct-current, current, no-current signals, said distortion including a sloping front due to delayed build up, and a sloping rear due to delayed decay of the received signals, said slopes substantially equal but of opposite sign, said distortion including also oscillations of the tails of both current and no-current signals, said oscillations resembling a damped oscillatory transient oscillating about the normal full-current value on a current signal and about the zero-current value on a no-current signal, means connected to said relay responsive to the reception of said signals for actuating said generating circuit so as to generate a timed damped oscillatory transient voltage corresponding to said distortion of the tails of the received signals, and means for impressing said transient voltage on said relay so that its effect opposes the distortion in the tail of the signal presently being received so as to effectively annul said distortion in said tail, so that the duration of said signals as measured between mean current value points on said sloping fronts and on said sloping rears corresponds to that of the signals as transmitted.

KENNETH W. PFLEGER.

REFERENCES CITED

The following references are of record in the file of this patent:

UNITED STATES PATENTS

| Number | Name | Date |
|---|---|---|
| 1,902,183 | Rieber | Mar. 21, 1933 |
| 1,964,505 | Cummings | June 26, 1934 |
| 2,216,820 | Lewis | Oct. 8, 1940 |
| 2,280,018 | Agnew | Apr. 14, 1942 |
| 2,450,352 | Piety | Sept. 28, 1948 |